United States Patent Office 3,258,344
Patented June 28, 1966

3,258,344
COLOR STABILIZATION OF CURED MEAT
Joseph L. Shank, Tinley Park, John H. Silliker, Park Forest, and Robert H. Harper, Wonder Lake, Ill., assignors to Swift & Company, Chicago, Ill., a corporation of Illinois
No Drawing. Filed Apr. 18, 1963, Ser. No. 273,860
5 Claims. (Cl. 99—107)

This application is a continuation-in-part of the copending application S.N. 32,606, filed May 31, 1960, and now abandoned. This invention relates in general to a method of treating edible materials containing a cured, cooked heme pigment in order to obtain a particularly desirable color therein and a color which is stabilized for a longer period of time than is generally obtainable. The invention also relates to the product resulting from this treatment, and to the color stabilizing agent.

One problem which confronts the processor of edible cured meats (flesh of edible quadrupeds, fish, and poultry) is deterioration in the color of the surface of the meat after processing and before it is sold or used. Another problem is in maximum development of a good, cured color. The surface discoloration of cured, cooked meats is largely caused by oxidation of the at least partially denatured, cured heme pigments, nitric oxide myochromogen and nitric oxide hemochromogen. The desirable color of these pigments is the red color commonly associated with cured meat. It is substantially indistinguishable from the color of cured, uncooked meat. Oxidation of the cured, cooked pigments causes formation of the grayish-brown pigments metmyochromogen and methemochromogen. While this grayish-brown color of the met pigments (spoken of herein as surface discoloration) is not indicative of a bacterially spoiled product, the appearance of the product is unattractive and a prospective purchaser may mistakenly believe that the product is bacteriologically unsafe. Therefore, such product is often unsalable.

It has previously been found effective to employ ascorbic acid or its salts to preserve the desired red color of cured meats for extended time periods. The mechanism by which ascorbic acid stabilizes the color of cooked, cured meats is believed to be its ability to reduce the met pigments (which form by oxidation) to myochromogen and hemochromogen. These, then, recombine with the nitric-oxide to form the desired red, cured, cooked pigments. When ascorbic acid is used, it is necessary that oxygen-free conditions, such as vacuum mixing and subsequent vacuum packaging, be employed. When the use of ascorbic acid for this purpose is advantageous, we have discovered a method of treating cured and cooked pigments which affords significantly better color stabilization than ascorbic acid and which affords some color protection even in the absence of vacuum mixing and/or packaging.

It is, therefore, a principal object of our invention to provide a process for prolonging the time period during which cured, cooked meat possesses a desirable red color.

A further object of the invention is to provide a method whereby the red pigments of cured, cooked meats are maintained therein for extended periods of time.

An additional object lies in the provision of a method whereby color can be stabilized without the requirement of substantially oxygen-free conditions.

An additional object is to provide a product containing a cured, cooked heme pigment which product is stabilized against surface discoloration.

A still further object is to provide a color stabilizing agent for cooked meat containing a nitric-oxide heme pigment producing material.

Further objects and advantages of this invention will become apparent to those skilled in the art from a reading of the following description of the invention.

We have discovered that by contacting an edible meat containing product that contains a nitric-oxide heme pigment producing material with a small amount of a particular bacterially produced by-product it is possible to stabilize the desirable red color of the cured cooked pigments and stabilize the color against fading for an extended time period. It is preferable to add the color stabilizing agent after the product is cooked. Otherwise (as is known to those familiar with handling of bacterially produced by-products) care should be taken during cooking to avoid decrease in effectiveness of the color stabilizing agent by heat. The color protection will extend considerably beyond that period which is possible with the addition of presently known cured meat color stabilizers.

The active color protecting agent is a component present in a cell-free culture medium which has supported the growth of certain microorganisms of the family Lactobacteriaceae. Neither the culture medium before growth of the bacteria nor the culture medium after growth with the cells left in give color protection.

The active color protecting agents are present in the cell-free culture medium which has supported the growth of certain nonpathogenic organisms of the family Lactobacteriaceae. Members of this family include the following genera: Lactobacillus, Streptococcus, Pediococcus, Diplococcus, and Leuconostoc. These genera have been found very suitable as the source of the bacteria for production of the culture medium. These bacteria can be characterized as nonpathogenic, saprophytic lactic-acid-producing organisms which ferment sugar. They are characteristically found in food and dairy products and in fermenting plant juices. The Streptococci, Lactobacilli, and Pediococci, in particular, are known to produce the desired "tang" in fermented sausage. In general, the microorganisms most useful in producing the cell-free culture medium of the invention resemble the milk-souring bacteria S. lactis. Since there are many strains and varieties of such organisms found in cured meats and bacteria indigenous to cured meats can very conveniently be employed to produce the cell-free culture, is is evident that mixtures of these microorganisms can also be employed to produce the cell-free culture medium used in the method of the invention.

Examples of satisfactory organisms of the genus Streptococcus which can be employed in the invention are S. thermophilus, S. salivarius, S. lactis, and S. cremoris. Species of the genus Lactobacillus which can be employed to obtain the benefits of the invention include, but are not restricted to L. lactis, L. acidophilus, L. bulgaricus, L. delbrueckii, L. thermophilus, and L. brevis. Others include L. citrovorum and L. dextranicus of the genus Leuconostoc, as well as P cerevisiae and P. acidilactis of the genus Pediococcus.

It is understood, of course, that certain of the aforementioned species are more effective than others in stabilizing the desirable color in cured meat products, but it is within the skill of those experienced in the art without the exercise of invention to utilize the most effective specie for a given type of meat product.

The color stabilizing component is prepared by growing the bacteria in a culture medium containing assimilable sources of carbon, nitrogen, and oxygen. The culture medium we prefer consists of mineral salts, sugar, and yeast extract in a water base that preferably contains some gelatin. When cell growth has progressed to an effective level, the living bacterial cells are spun out of the culture, for example, by centrifuging, and the remaining culture filtrate will contain the desired color protecting agent. A level of cell growth which is effective in our process will generally be reached in about 12 hours. Of course, if a very heavy inoculum is placed on the medium, less time will be required. The preferred incubation period is from about 12 to 72 hours. Longer growth periods can be used, e.g., 90–100 hours, but the increase in effectiveness of the color stabilizing component produced levels off so that for most purposes such extended incubation periods are not required. The filtrate may be used as is, e.g., as at least a part of the necessary liquid when formulating cured meat emulsions, or it may be dried and added to the meat in the dry state.

Specifically, we have prepared a filtrate containing the color stabilizing agent as follows: Streptococcus organisms isolated from bacon were allowed to grow on a culture medium having the following composition:

| | Percent |
|---|---|
| Gelatin | 1 |
| Yeast extract | 0.3 |
| Glucose | 0.2 |
| Sucrose | 2.3 |
| $K_2HPO_4$ | 0.5 |
| $KH_2PO_4$ | 0.2 |
| Water, ml. | 100 |

In this specific example of filtrate preparation we used a 72-hour culture. The cells were then removed by centrifugation, leaving the cell-free filtrate. If a dried material is to be prepared, the cell-free culture filtrate may be vacuum distilled to a syrupy consistency and then roller dried. An alternative method for drying the material is to place it on screens and dry it in a hot-air tunnel. If this method is used, it is preferable that more gelatin be present in the original culture medium, for example, 5% additional. It will be appreciated by those familiar with the art of drying normally liquid materials that other means for desiccating the product can be utilized.

The composition of the culture medium may be varied somewhat from that mentioned previously herein and still provide good nutrient material for the cell growth and development in the medium of the active color stabilizing component. For example, up to about 6–8% gelatin can be used to 100 ml. of water and plus or minus about ½ gram to the quantity of the other ingredients listed above is effective. Monosaccharides other than glucose can be used, e.g., fructose, arabinose, etc., and the potassium orthophosphates can be replaced by other buffering systems. It is apparently only necessary that the mineral salts, sugar, and yeast extract be present in amounts sufficient to maintain cell growth. The bacterially produced by-product of this growth which remains in the culture filtrate after cell removal is the color protecting agent.

The amount of the color protecting agent that must be added to the meat is very small. For example, when at least one-third of the percentage of $H_2O$ (solid or liquid) normally added to cooked sausage emulsions is substituted with the cell-free filtrate of our invention, a color stabilization effect will result. Generally about 30% $H_2O$ is added to such emulsions. When it is remembered that the filtrate is principally water and that the culture medium before supporting growth of the Streptococci has no color stabilizing ability it will be apparent that the quantity of active agent necessary is extremely small. Amounts of the cell-free culture medium as low as about 10% by weight of the emulsion provide a noticeable inhibition of color degradation.

The following examples are presented to illustrate the invention only and are not intended to limit the scope thereof other than as appears in the appended claims.

Example I

A culture medium comprising multiples of the following proportions:

| | |
|---|---|
| Water, ml. | 100 |
| Gelatin (by weight of medium), percent | 1 |
| Yeast extract, percent | 0.3 |
| Glucose, percent | 0.2 |
| Sucrose, percent | 2.3 |
| Potassium monohydrogen orthophosphate, percent | 0.5 |
| Potassium dihydrogen orthophosphate, percent | 0.2 | was prepared and inoculated with Streptococcus organisms obtained from cured meat. After 72 hours the Streptococci were removed by centrifugation, leaving a cell-free culture filtrate.

A cooked and cured, comminuted seasoned pork and beef mixture was prepared and divided into two portions. Water was added to one portion to form a meat emulsion. The emulsion was vacuum mixed to remove occluded oxygen and 0.05% (by weight of the portion) of sodium ascorbate was added with an additional vacuum mixing operation. This ascorbate treated portion was vacuum packed and the package exposed to 35 foot candles of light at 40° F. To the other portion 30% (by weight) of the above filtrate was added without vacuum mixing. The filtrate treated portion was vacuum packed and exposed to the same light treatment as the ascorbate treated portion. The following table gives color ratings on the two portions at various times. The ratings are based on an arbitrary color scale of 10 for excellent, 1 for very poor. Generally a product having a color rating below about 5 would be unacceptable to consumers.

TABLE I

| Material | Hours Exposed to Light | | | |
|---|---|---|---|---|
| | 18 | 24 | 41 | 72 |
| Ascorbate-treated | 9 | 8 | 8 | 7 |
| Filtrate-treated | 10 | 10 | 10 | 9 |

Example II

A cooked and cured meat mixture was prepared and divided into two portions. One portion acted as a control and had added thereto 30% $H_2O$, by weight (15% ice, 15% water). To the other portion was added 30% of the filtrate prepared as in Example I. The emulsions were vacuum packed in polyethylene plastic film and exposed to 35 foot candles of light at 40° F. The following data show the marked color stabilization effect of the cell-free culture.

| | Exposure to Light | | | | |
|---|---|---|---|---|---|
| | Initial | 6 hrs. | 3 days | 4 days | 7 days |
| Control | 8 | 4 | 4 | 4 | 2 |
| Cell-free culture added | 9 | 9 | 9 | 8 | 7 |

Example III

A cured, cooked sausage mixture was prepared. An emulsion was prepared with approximately 30% water, containing no additional ingredients, as a control. To other aliquot portions of the mixture water was added containing ascorbic acid, a cell-free culture of Streptococci basteria obtained from dried sausage prepared as in Example I, bacterial cells obtained when filtering to obtain the cell-free culture, culture containing the Streptococci cells, and sterile culture, to produce emulsions of about the same solids content as the control. The product was vacuum packed and stored in exposure to 35 foot candles of light for 18 hours. The following color determinations were made after such exposure:

Additive: Color
- Control ------------------------------ 5
- Cell-free culture ---------------------- 9
- Bacterial cells in water --------------- 7
- Culture containing cells --------------- 5
- Sterile culture ------------------------ 6
- Ascorbic acid ------------------------- 7

*Example IV*

The following show the color stabilizing effect on vacuum packed and unvacuum packed product. Cured, cooked meat mixtures were prepared and divided into aliquot portions. About 30% liquid was added to form an emulsion and the product packaged. A water treated sample was the control. To one portion 30% of the filtrate prepared as in Example I was added; to another a Streptococci suspension in water; to yet another water plus ¾ oz. per 100 lbs. ascorbic acid; and to a final portion 30% by weight liquid containing sterile culture medium. The following table shows color determinations after exposure to light for the time indicated.

TABLE II

| Additive | Vacuum Packed | | | | Not Vacuum Packed | | |
|---|---|---|---|---|---|---|---|
| | 0 hrs. | 18 hrs. | 24 hrs. | 48 hrs. | 45 min. | 1.5 hrs. | 3 hrs. |
| Control | 8 | 5 | 4 | 3 | 4 | 3 | 2 |
| Cell-free culture | 9 | 9 | 9 | 9 | 7 | 6 | 4 |
| Strept. suspension | 9 | 7 | 4 | 4 | 4 | 3 | 2 |
| Ascorbic acid | 9 | 7 | 7 | 7 | 4 | 3 | 2 |
| Sterile culture | 8 | 5 | 4 | 4 | 4 | 3 | 2 |

Obviously, many modifications and variations of the invention as hereinbefore set forth may be made without departing from the spirit and scope thereof and, therefore, only such limitations should be imposed as are indicated in the appended claims.

We claim:
1. A method of protecting the color of an edible cured, cooked meat-containing mixture which comprises: preparing a cooked, cured meat-containing mixture and incorporating therein a small amount sufficient to stabilize the color of said mixture of an aqueous solution of gelatin, yeast extract, sugar and mineral salts from which solution a 12–72 hour culture of a lactic-acid-producing bacteria of the family Lactobacteriaceae has been removed to provide a cell free medium.

2. A method for protecting the color of an edible cured, cooked meat-containing mixture which comprises: preparing a cooked, cured meat-containing mixture and incorporating therein at least about 10% by weight of an aqueous filtrate containing a cell free bacterial nutrient medium from which a 12–72 hour culture of nonpathogenic bacteria from the group consisting of Diplococcus, Streptococcus, Pediococcus, Leuconostoc and Lactobacillus have been removed and mixtures of such media.

3. A method of producing a cured, cooked edible meat product having the cured color thereof stabilized against fading and discoloration which comprises: incorporating in a meat product containing a nitric oxide heme pigment producing material, a color stabilizing amount of a cell-free culture medium on which nonpathogenic saprophytic bacteria of the family Lactobacteriaceae have been cultured.

4. A method for stabilizing the color of cured, edible cooked meat which comprises incorporating in cooked, cured meat a small amount sufficient to stabilize the color of said meat of a bacterial culture medium from which living lactic-acid-producing bacteria of the family Lactobacteriaceae have been removed.

5. A method for protecting the color of a cured, cooked meat-containing mixture which comprises preparing a meat-containing mixture containing a nitric oxide heme pigment producing material and incorporating in said meat mixture a small amount sufficient to stabilize the color of said mixture of a bacterial nutrient medium from which at least a 12-hour culture of nonpathogenic bacteria from the family Lactobacteriaceae has been removed.

References Cited by the Examiner

UNITED STATES PATENTS 2,596,067  5/1952  Brissey _____ 99—159
2,792,305  5/1957  Harper _____ 99—107 X

FOREIGN PATENTS 804,296  11/1958  Great Britain.

A. LOUIS MONACELL, *Primary Examiner.*

HYMAN LORD, *Examiner.*